Figures 1, 2:
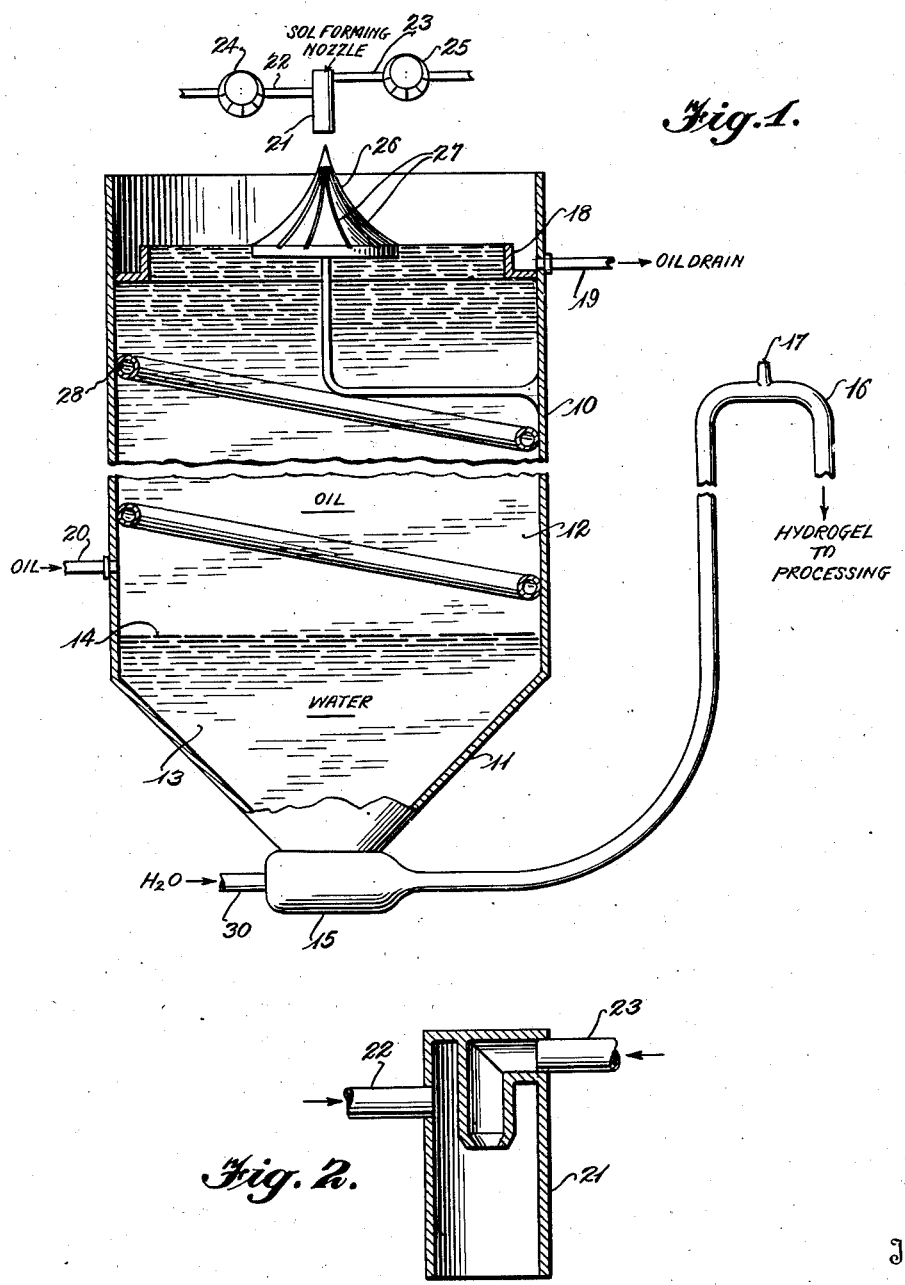

March 18, 1947.   A. C. SCHMITT   2,417,664

SILICA-BERYLLIA GEL

Filed Sept. 30, 1944

Inventor
Arthur C. Schmitt
By Oswald N. Hayes
Attorney

Patented Mar. 18, 1947

2,417,664

UNITED STATES PATENT OFFICE 2,417,664

SILICA-BERYLLIA GEL

Arthur C. Schmitt, Wenonah, N. J., assignor to Socony-Vacuum Oil Company, Incorporated, a corporation of New York Application September 30, 1944, Serial No. 556,631

32 Claims. (Cl. 252—317)

This invention relates to a process for preparing true hydrogels comprising silica and beryllia without forming substantial amounts of structurally weak gelatinous precipitates. In a preferred embodiment, the invention contemplates preparation of small beads of such gels which, upon drying, are hard, translucent to transparent and very strong.

The distinction between true gels and gelatinous precipitates is important to an understanding of the objects of this invention. The prior art has frequently confused these terms, reference being frequently made to "gels" when it is obvious that the product so misnamed is a gelatinous precipitate. Using silica as an outstanding example, a true hydrogel may be formed by adding water glass to acid in such concentrations and proportions that a clear hydrosol is formed which thereafter congeals to a firm resilient hydrogel containing all the water of the hydrosol. If, on the other hand, acid be added to water glass, masses of gelatinous precipitates of silica will separate out and these may be readily separated from the principal portion of the aqueous medium by filtration. If the concentrations, proportions and pH are properly adjusted, it is possible to add acid to water glass in a manner to form a gel which includes a major proportion of gelatinous precipitate formed during the period of addition of acid. Whenever precipitate is formed of a composite nature, e. g., silica-alumina, the product is inhomogeneous due to the fact that the silica and alumina do not precipitate in the same ratio throughout the acid addition period. This lack of homogeneity has been shown to adversely affect the catalytic properties of inorganic oxide composites. Further, the precipitates are structurally weak. These two major disadvantages are encountered whether or not the final product is wholly gelatinous or is in the form of a gel in which large amounts of precipitate are occluded.

The present invention is concerned with true hydrogels as distinguished from gelatinous precipitates on the basis of the above definition. In addition to the chemical homogeneity and mechanical strength of true hydrogels, the invention utilizes, as a preferred embodiment, the teachings of U. S. Patent No. 2,385,217, issued September 18, 1945, to Milton M. Marisic. According to the process of that application, a gelable sol having an appreciable, but preferably short, gelation time is injected into a body of a water immiscible liquid such as a petroleum distillate fraction. In the oil or other water immiscible liquid, the sol separates into a plurality of sol units which assume spherical shape. The sol globules are caused to remain in the oil until gelation occurs, whereupon they are removed, washed and dried. The dried product is in the form of hard, transparent to translucent beads similar in general appearance to glass beads but containing a tremendous number of extremely fine pores. The hard smooth surfaces and spheroidal shape of these beads renders them very resistant to breakage and attrition losses.

The success of the bead gel technique depends upon the fact that gelation time of various inorganic oxide sols may be readily controlled. The gelation time is dependent upon concentration, temperature and pH and, in general, the gelation time tends to decrease with increase in any of these variables. Many inorganic oxides may form component parts of hydrogels under varying conditions and many of them, alumina for example, may be combined with silica in a true hydrogel without substantial difficulty. However, the known techniques cannot be applied to form hydrogels containing a major proportion of silica and a substantial proportion of beryllia.

It is a primary object of my invention to provide a process for preparing true hydrogels of silica-beryllia containing no substantial amounts of gelatinous precipitates. My invention further contemplates the preparation of silica-beryllia gels containing amounts of beryllia sufficient to obtain adequate activity of the dried gel for catalytic cracking of hydrocarbons. As a preferred embodiment it is contemplated that the gel be prepared in bead form. In all its embodiments, the invention provides for increased solids concentration in the hydrogel, thus decreasing drying costs.

The objects and advantages of the invention will be better understood by comparison with preparation of silica-alumina hydrogels. The conventional method of preparing plural oxide co-gels of various metal oxides with silica, consists in adding a solution of a salt of the desired metal to the acid used in adjusting the pH of the hydrosol, and then adding to this mixture with rapid mixing a suitable amount of sodium silicate solution. If the desired metal is to be introduced as a metalate, such as sodium aluminate, the metalate, being alkaline, is added to the sodium silicate, and this mixture then added to the acid solution with rapid mixing. When aluminum nitrate or sodium aluminate is used as the source of alumina, a composite gel with silica may be formed, containing up to 15.% $Al_2O_3$ having a product concentration greater than five grams of dry inorganic oxides per 100 cc. of hydrogel in the pH range of 5 to 8.5 preferred in preparation of cracking catalysts. If one attempts to prepare silica-beryllia gels by this method, a maximum for beryllia content is reached at about 7% BeO, above which a true gel can be made only by reducing both pH and/or product concentration below the preferred limits. Example I is a typical preparation in which a 10% BeO gel was made by the conventional method.

In general silica gels containing BeO achieve optimum cracking activity at concentrations of the beryllium oxide greater than 7%. I have now found that silica beryllia hydrogels containing no substantial amounts of gelatinous precipitate may be prepared at pH 5 to 8.5, concentrations of greater than 7% BeO on dry basis and good product concentration by adding an aqueous solution of a water soluble beryllium compound to a preformed acidic silica hydrosol and thereafter adding a buffer solution such as ammonium acetate, sodium acetate, sodium or ammonium citrate and the like to adjust the pH of the complete sol to the range 5 to 8.5. Preferred buffers are alkali metal salts or organic acids. The alkali metal is readily removed by base exchange and the organic radical is removed by oxidation, if desired.

The catalysts of this invention may be defined as plural oxide gels containing beryllia. Such gels comprise a major proportion of silica and a minor amount of beryllia; furthermore, these gels may contain minor quantities of oxides of the third and fourth groups of the periodic table such as $Al_2O_3$, $ThO_2$, $ZrO_2$, $CeO_2$, $SnO_2$ and etc.

These improved catalysts are suitable for hydrocarbon conversion processes involving the reactions of cracking, reforming, isomerization, polymerization, desulfurization and etc. In the polymerization of normally gaseous olefins such as ethylene, propylene and butylenes into higher molecular weight materials, especially to hydrocarbons boiling within the gasoline range, the plural oxide gels containing beryllia have been found to be extremely efficient as catalysts. Under proper reaction conditions, these catalysts function to isomerize selectively normal olefinic hydrocarbons to iso-olefinic compounds. For example, normal butenes can be isomerized to high yields of iso-butene. Normal paraffinic hydrocarbons as normal pentane may be isomerized to isopentane. These gel catalysts are especially adapted to accelerate the cracking of heavy fractions of petroleum and to reform lighter fractions such as gasoline so as to increase the rate of production of high antiknock gasoline.

The hydrogels of this invention may be prepared for use as catalysts by gelling in vats or the like and then breaking up the gel, washing and drying. The gels may be utilized as broken fragments or as pellets prepared by molding, extruding or the like. Preferably, however, the gel is prepared in bead form. Apparatus for practicing this preferred embodiment is shown in the annexed drawings wherein:

Figure 1 is an elevation in partial section of apparatus for forming hydrogel globules of spheroidal shape, and Figure 2 is a sectional view of the mixing nozzle shown in Figure 1.

Referring specifically to Figure 1, the bead form gel is prepared in a forming tower 10 which is a vertical vessel having an open top and a conical bottom 11. A column of oil or other water immiscible liquid 12 fills the major portion of the tower and an aqueous liquid 13, usually water, lies below an interface 14. Water is supplied to an eductor 15 by a pipe 30 to carry the spheroidal hydrogel off through goose-neck 16 for processing. A vent 17 at the top of the goose-neck prevents siphoning action and aid in liquid level control in the tower. The top level of the oil is maintained in large measure by the annular channel 18 at the upper part of tower 10, excess oil being drawn off by drain 19. A slow stream of oil is admitted by pipe 20 to maintain the oil level regardless of fluctuations in pressure at the communication between conical bottom 11 and eductor 15.

A gelable sol, having a gelation time correlated to the depth of the oil columns and the rate of fall through the oil in order that gelation shall occur before the globules enter the aqueous medium 13 is prepared and introduced by a mixing nozzle 21. Reaction solutions to form the desired sol are fed to the mixing nozzle by lines 22 and 23 from metering pumps 24 and 25 at predetermined rates. The reactant solutions may, if desired, be cooled or heated prior to mixing in order to adjust and control the gelation time.

The sol leaving nozzle 21 falls onto the apex of a conical wax divider 26 having a plurality of grooves 27 beginning a point a little below the apex. The sol is thus split up into a plurality of small streams, each of which is further subdivided upon entering the oil 12 into a plurality of globules. Means, such as heat exchange coil 28, are included in the tower for heating or cooling the oil bath 12 to alter the temperature of the sol globules and thus affect the gelation time thereof. A very satisfactory arrangement for many purposes is to cool the reactant solutions admitted by pipes 22 and 23 and heat the oil bath whereby a sol will be formed which has a long gelation time at high concentration of product. This reduces the amount of gelation occurring on the divider and yet it is found unnecessary to use a very long column of oil since the sol is heated and its gelation time greatly reduced upon entering the oil bath.

In the following examples are set our representative preparations of gels containing silica and beryllia. The first two examples show the type of gels which can be prepared when using more or less conventional techniques of sol preparation. These are supplied for comparison with the remaining examples utilizing the principles of my invention.

EXAMPLE I

*Silica-beryllia gel—90% $SiO_2$, 10% BeO (on dry weight basis)*

A sodium silicate solution containing 0.213 gram of $SiO_2$ per cc. (prepared by diluting "N" brand sodium silicate) was mixed in nozzle 21 with an acid solution prepared by mixing 119.9 cc. of beryllium nitrate solution containing 0.05 gram BeO per cc., 50.8 cc. of 3.78 N hydrochloric acid and 1575 cc. of distilled water. The ratio of mixing was such that 254 cc. of the sodium silicate solution were mixed with the acid solution. The resulting hydrosol had a gelation time of one hour and fifteen minutes at room temperature or thirty seconds at 95° C. and a pH of 4.6. The gel has a product concentration of about 3 grams per 100 cc.

The sol was introduced to an oil bath heated by steam coils to about 95° C. and the resultant globules of clear firm gel were withdrawn, partially dehydrated at 180° F. to 50% of the original weight and washed free of nitrate and chloride by decantation with distilled water. The pellets were then substantially freed of sodium ions by base exchanging in five per cent ammonium chloride solution. The gel was then again water washed to remove chloride and dried, the temperature being gradually raised to 1050° F. The gel was maintained at the latter temperature for five hours prior to testing as a cracking catalyst.

EXAMPLE II

*Preparation of silica-beryllia-alumina catalyst—90% $SiO_2$, 7% BeO, 3% $Al_2O_3$ (on dry basis)*

256 cc. of sodium silicate solution, of the concentration used in Example I, was added in the mixing nozzle to a well agitated acid solution containing 84.8 cc. of beryllium nitrate solution having an oxide concentration of 0.05 gram of BeO per cc., 43.2 cc. of aluminum sulfate solution of strength equivalent to 0.042 gram of $Al_2O_3$ per cc., 21.6 cc. of 3.78 N hydrochloric acid, and 1600 cc. of distilled water. This hydrosol set to a clear firm gel in about four minutes at room temperature. The pH of the hydrosol was 6.5. The product concentration of the gel was about 3.4 grams per 100 cc.

The hydrogel pellets thus obtained were partially dried, washed and finally dried as described in Example I.

EXAMPLE III

*Silica-beryllia-zirconia catalyst—85% $SiO_2$, 10% BeO, 5% $ZrO_2$ (on dry basis)*

To 594 cc. of water glass solution, of the concentration used in Example I, were added 960 cc. of distilled water. This solution was added to a well agitated solution containing 168 cc. of zirconium sulfate solution, having an oxide concentration of 0.045 gram of $ZrO_2$ per cc., and 900 cc. of 4.042 N hydrochloric acid. To this solution was added sodium beryllate solution containing 0.05 gram of BeO per cc. prepared by dissolving 101.3 grams of sodium hydroxide (95%) in 300 cc. of a beryllium nitrate solution made up to contain 0.05 gram of BeO per cc., 600 cc. of an 8 N solution of ammonium acetate was then added to this solution in the mixing nozzle, care being taken to avoid too much violent agitation, otherwise excessive foaming will result. This hydrosol set to a clear firm gel in ten minutes at room temperature or in thirty seconds at 75° C. The pH of the hydrosol was 5.2 and the gel had a product concentration of 4.4 grams per 100 cc.

The hydrogel was partially dried, washed and finally dried as described in Example I.

EXAMPLE IV

*Silica-beryllia-thoria-catalyst—75% $SiO_2$ 10% BeO, 15% $ThO_2$ (on dry basis)*

360 cc. of water glass solution, containing 0.208 grams of $SiO_2$ per cc. (prepared by diluting "N" brand sodium silicate) was added to a well agitated acid solution containing 500 cc. of 4.042 N HCl, 300 cc. of thorium nitrate solution containing 0.05 gram of $ThO_2$ per cc., and 240 cc. of distilled water. To this hydrosol, 200 cc. of a freshly prepared solution of sodium beryllate containing 0.05 gram of BeO per cc. was then added, with rapid stirring, followed by 400 cc. of 8 N ammonium acetate in the nozzle. The resulting hydrosol set to a clear, firm gel in 2 minutes at 15° C. or in thirty seconds at 35° C. having a pH of 5.5.

Gel prepared according to the above directions has a product concentration of 5 grams per 100 cc.

The hydrogel was partially dried, washed and finally dried as described in Example I.

EXAMPLE V

*Silica-beryllia-zirconia-catalyst—80% $SiO_2$, 10% BeO, 10% $ZrO_2$ (on dry basis)*

385 cc. of water glass solution, of the concentration used in Example IV, was added to a well agitated acid solution containing 600 cc. of 4.042 N HCl, 100 cc. of zirconium sulfate solution containing 0.10 gram of $ZrO_2$ per cc., and 315 cc. of distilled water. To this hydrosol, 200 cc. of a freshly prepared solution of sodium beryllate, containing 0.05 gram of BeO per cc., was then added, with rapid stirring, followed by 400 cc. of 8 N ammonium acetate in the nozzle. The resulting hydrosol set to a clear, firm gel in seven minutes at 25° C. or in thirty seconds at 60° C. having a pH of 5.2.

Gel prepared according to the above directions has a product concentration of 5 grams per 100 cc.

The hydrogel was partially dried, washed and finally dried as described in Example I.

EXAMPLE VI

*Silica-beryllia-alumina-catalyst—88% $SiO_2$, 7% BeO, 5% $Al_2O_3$ (on dry basis)*

Solution A was prepared by adding 411 cc. of a water glass solution containing 0.214 gram of $SiO_2$ per cc. (prepared by diluting "N" brand sodium silicate) to 600 cc. of 4.042 N HCl, with rapid stirring.

Solution B was prepared by mixing 140 cc. of sodium beryllate solution, containing 0.05 gram of BeO per cc., with 166 cc. of sodium aluminate solution, containing 0.03 gram $Al_2O_3$ per cc.

Solution B was then added to solution A, the two being thoroughly mixed until a clear solution having a pH of 1.7 was obtained. Finally, 400 cc. of 8 N ammonium acetate was blended therewith in the nozzle. The resulting hydrosol set to a clear, firm gel in ten minutes at 19° C. or thirty seconds at 60° C., having a pH of 5.5.

Gel prepared according to the above directions has a product concentration of 5.8 grams per 100 cc.

The hydrogel was partially dried, washed and finally dried as described in Example I.

The catalysts described in the above examples were tested in the cracking of a fraction of Oklahoma City gas oil having a boiling range from 470° F. to 708° F. The oil vapors were conducted through the catalyst bed at 800° F. and at a liquid space velocity of 1.5 for twenty minute periods between regenerations. Results of these tests are tabulated below. Cracking activity is defined as the volume per cent conversion of the oil charged to 410° F. end-point gasoline.

| Example | Catalyst composition on dry basis | Cracking activity |
|---|---|---|
| I | 10% BeO, 90% $SiO_2$ | 30 |
| II | 7% BeO, 3% $Al_2O_3$, 90% $SiO_2$ | 36 |
| III | 10% BeO, 5% $ZrO_2$, 85% $SiO_2$ | 43 |
| IV | 10% BeO, 15% $ThO_2$, 75% $SiO_2$ | 41 |
| V | 10% BeO, 10% $ZrO_2$, 80% $SiO_2$ | 52 |
| VI | 7% BeO, 5% $Al_2O_3$, 88% $SiO_2$ | 48 |

Example VII

*Silica-beryllia-catalyst—80% $SiO_2$, 20% BeO (on dry basis)*

378 cc. of water glass solution containing 0.211 gram of $SiO_2$ per cc. (prepared by diluting "N" brand sodium silicate) was added to a well agitated solution of 233 cc. of 3.905 N hydrochloric acid in 333 cc. of distilled water. 400 cc. of beryllium nitrate solution, containing an equivalent of 0.05 gram BeO per cc., was then added to the above acidic silica hydrosol, with rapid stirring. The pH at this point was 0.6. Rate of stirring was then reduced, and 656 cc. of 8 N ammonium acetate was added. The resulting hydrosol set to a clear firm gel in fifty minutes at room temperature, or about thirty seconds at 80° C. The pH was 5.0 and the product concentration 5 grams per 100 cc. This hydrogel was partially dried, washed and base exchanged with 5% beryllium nitrate solution. Final drying was carried out at 1050° F. The composition of the finished catalyst is: 80% $SiO_2$, 20% BeO.

This catalyst is also highly effective for catalytic cracking of gas oil.

Example VIII

A gel of the same oxide composition as Example VI (88% $SiO_2$, 7% BeO, 5% $Al_2O_3$) was prepared using sodium acetate as a buffer in place of ammonium acetate, and aluminum sulfate as a source of aluminum oxide in place of sodium aluminate. The preparation is as follows:

Solution A as prepared by diluting 489 cc. of water glass containing 0.212 gram of $SiO_2$ per cc. (prepared by diluting "N" brand sodium silicate) with 212 cc. of distilled water.

Solution B was prepared by mixing 144 cc. of aluminum sulfate solution containing 0.041 gram of $Al_2O_3$ per cc. with 354 cc. of 3.905 N hydrochloric acid.

Solution A was then added to solution B with rapid stirring, to form a silica-alumina hydrosol. To this hydrosol was added, with stirring, 165 cc. of a beryllium nitrate solution containing 0.05 gram of BeO per cc. The resulting silica-alumina-beryllia hydrosol had a pH of 0.5. 637 cc. of 5 N sodium acetate was then slowly stirred into the acid hydrosol, which thereupon set to a hydrogel in four minutes at room temperature or thirty seconds at 55° C. This gel had a pH of 5, and a product concentration of 5.9 grams per 100 cc. This gel was partially dried, washed, base exchanged and dried at 1050° F. as described in Example I. The composition of the finished catalyst is: 88% $SiO_2$, 7% BeO, 5% $Al_2O_3$.

The catalysts described herein are highly effective for catalytic desulfurization of hydrocarbon oils. Typical results are tabulated below for treatment of Slaughter-Duggan gas oil containing 1.77% sulfur at 650° F. Liquid recovery in each case was better than 95% and removal of sulfur is shown below:

| Catalyst | Sulfur removed |
|---|---|
| | Per cent |
| Commercial silica gel | 16 |
| 97% $SiO_2$, 3% BeO | 25 |
| 80% $SiO_2$, 20% BeO | 31 |
| 88% $SiO_2$, 7% BeO, 5% $Al_2O_3$ | 50 |
| Silica-alumina gel base exchanged with $Be(NO_3)_2$ | 58 |

I claim:

1. In a process for preparing a hydrosol containing silica and beryllia, the steps which comprise forming a silica hydrosol, adding an aqueous solution of a water soluble compound of beryllium to said hydrosol and adding an aqueous buffer solution to resultant mixture; the amounts and acidity of the said hydrosol and the two said aqueous solutions being so adjusted that the pH of the mixture of the three shall be between about 5 and about 8.5.

2. In a process for preparing a hydrosol containing silica and beryllia, the steps which comprise forming a silica hydrosol, by adding water glass to acid, adding an aqueous solution of a water soluble compound of beryllium to said hydrosol and adding an aqueous buffer solution to the resultant mixture; the amounts and acidity of the said hydrosol and the two said aqueous solutions being so adjusted that the pH of the mixture of the three shall be between about 5 and about 8.5.

3. In a process for preparing a hydrosol containing silica and beryllia, the steps which comprise forming a silica hydrosol, adding an aqueous solution of sodium beryllate to said hydrosol and adding an aqueous buffer solution to resultant mixture; the amounts and acidity of the said hydrosol and the two said aqueous solutions being so adjusted that the pH of the mixture of the three shall be between about 5 and about 8.5.

4. In a process for preparing a hydrosol containing silica and beryllia, the steps which comprise forming a silica hydrosol, by adding water glass to acid, adding an aqueous solution of sodium beryllate to said hydrosol and adding an aqueous buffer solution to the resultant mixture; the amounts and acidity of the said hydrosol and the two said aqueous solutions being so adjusted that the pH of the mixture of the three shall be between about 5 and about 8.5.

5. In a process for preparing a hydrosol containing silica and beryllia, the steps which comprise forming a silica hydrosol, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5.

6. In a process for preparing a hydrosol containing silica and beryllia, the steps which comprise forming a silica hydrosol, by adding water glass to acid, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5.

7. In a process for preparing a hydrosol containing silica and beryllia, the steps which comprise forming a silica hydrosol, adding an aqueous solution of sodium beryllate to said hydrosol and adding an aqueous buffer solution of ammonium acetate to resultant mixture; the amounts and acidity of the said hydrosol and the two said aqueous solutions being so adjusted that the pH of the mixture of the three shall be between about 5 and about 8.5.

8. In a process for preparing a hydrosol containing silica and beryllia, the steps which comprise forming a silica hydrosol, by adding water glass to acid, adding an aqueous solution of sodium beryllate to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5.

9. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, adding an aqueous solution of a water soluble compound of beryllium to said hydrosol and adding an aqueous buffer solution to resultant mixture; the amounts and acidity of the acid hydrosol and the two said aqueous solutions being so adjusted that the pH of the mixture of the three shall be between about 5 and about 8.5.

10. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, by adding water glass to acid, adding an aqueous solution of a water soluble compound of beryllium to said hydrosol and adding an aqueous buffer solution to the resultant mixture; the amounts and acidity of the said hydrosol and the two said aqueous solutions being so adjusted that the pH of the mixture of the three shall be between about 5 and about 8.5.

11. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, adding an aqueous solution of sodium beryllate to said hydrosol and adding an aqueous buffer solution to resultant mixture; the amounts and acidity of the said hydrosol and the two said aqueous solutions being so adjusted that the pH of the mixture of the three shall be between about 5 and about 8.5.

12. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, by adding water glass to acid, adding an aqueous solution of sodium beryllate to said hydrosol and adding an aqueous buffer solution to the resultant mixture; the amounts and acidity of the said hydrosol and the two said aqueous solutions being so adjusted that the pH of the three shall be between about 5 and about 8.5.

13. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5.

14. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, by adding water glass to acid, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and 8.5.

15. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, adding an aqueous solution of sodium beryllate to said hydrosol and adding an aqueous buffer solution of ammonium acetate to resultant mixture; the amounts and acidity of the said hydrosol and the two said aqueous solutions being so adjusted that the pH of the mixture of the three shall be between about 5 and about 8.5.

16. A process for forming spheroidal particles of hydrogel containing silica and beryllia which comprises injecting a gelable hydrosol into a body of a water immiscible liquid, whereby the sol is caused to separate into a plurality of spheroidal particles, retaining said particles in said liquid until gelation occurs and thereafter removing the spheroidal hydrogel particles from said liquid; said gelable hydrosol having been prepared by the steps which comprise forming a silica hydrosol, by adding water glass to acid, adding an aqueous solution of sodium beryllate to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5.

17. The process of claim 1, characterized in that the said silica hydrosol also contains a compound of a metal from the third and fourth groups of the periodic table which will be converted to the oxide during the process.

18. The process of claim 1, characterized in that the said silica hydrosol also contains zirconium sulfate.

19. The process of claim 1, characterized in that the said silica hydrosol also contains thorium nitrate.

20. The process of claim 1, characterized in that the said beryllate solution also contains sodium aluminate.

21. In a process for preparing a hydrogel containing silica and beryllia, the steps which comprise forming a silica hydrosol, adding an aqueous solution of a water soluble compound of beryllium to said hydrosol and adding an aqueous buffer solution to resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

22. In a process for preparing a hydrogel containing silica and beryllia, the steps which comprise forming a silica hydrosol, by adding water glass to acid, adding an aqueous solution of a water soluble compound of beryllium to said hydrosol and adding an aqueous buffer solution to the resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

23. In a process for preparing a hydrogel containing silica and beryllia, the steps which comprise forming a silica hydrosol, adding an aqueous solution of sodium beryllate to said hydrosol and adding an aqueous buffer solution to resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

24. In a process for preparing a hydrogel containing silica and beryllia, the steps which comprise forming a silica hydrosol, by adding water glass to acid, adding an aqueous solution of sodium beryllate to said hydrosol and adding an aqueous buffer solution to the resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

25. In a process for preparing a hydrogel containing silica and beryllia, the steps which comprise forming a silica hydrosol, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

26. In a process for preparing a hydrogel containing silica and beryllia, the steps which comprise forming a silica hydrosol, by adding water glass to acid, adding an aqueous solution of a water soluble compound of beryllium to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

27. In a process for preparing a hydrogel containing silica and beryllia, the steps which comprise forming a silica hydrosol, adding an aqueous solution of sodium beryllate to said hydrosol and adding an aqueous buffer solution of ammonium acetate to resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

28. In a process for preparing a hydrogel containing silica and beryllia, the steps which comprise forming a silica hydrosol, by adding water glass to acid, adding an aqueous solution of sodium beryllate to said hydrosol and adding an aqueous buffer solution of ammonium acetate to the resultant mixture; the amounts and acidity of the said hydrosol and the two said aqueous solutions being so adjusted that the pH of the mixture of the three shall be between about 5 and about 8.5; and maintaining the composition of said mixture substantially constant until the same sets to a firm hydrogel.

29. The process of claim 21, characterized in that the said silica hydrosol also contains a compound of a metal from the third and fourth groups of the periodic table which will be converted to the oxide during the process.

30. The process of claim 21, characterized in that the said silica hydrosol also contains zirconium sulfate.

31. The process of claim 21, characterized in that the said silica hydrosol also contains thorium nitrate.

32. The process of claim 21, characterized in that the said beryllate solution also contains sodium aluminate.

ARTHUR C. SCHMITT.

REFERENCES CITED

The following references are of record in the file of this patent:

UNITED STATES PATENTS

| Number | Name | Date |
| --- | --- | --- |
| 1,614,636 | Wachtel | Jan. 18, 1927 |
| 2,284,248 | Baker et al. | May 26, 1942 |
| 2,107,710 | Perkins et al. | Feb. 8, 1938 |

FOREIGN PATENTS

| Number | Country | Date |
| --- | --- | --- |
| 392,954 | British | May 22, 1933 |